W. A. FREDERICK.
AUTOMATIC OILER.
APPLICATION FILED JUNE 26, 1917.

1,255,087.

Patented Jan. 29, 1918.

Inventor
William A. Frederick

UNITED STATES PATENT OFFICE.

WILLIAM A. FREDERICK, OF BOSTON, MASSACHUSETTS, ASSIGNOR TO THE MOTOR CAR EQUIPMENT COMPANY, OF NEW YORK, N. Y., A CORPORATION OF NEW YORK.

AUTOMATIC OILER.

1,255,087.   Specification of Letters Patent.   Patented Jan. 29, 1918.

Application filed June 26, 1917. Serial No. 177,119.

*To all whom it may concern:*

Be it known that I, WILLIAM A. FREDERICK, a citizen of the United States, residing at Boston, in the county of Suffolk and State of Massachusetts, have invented certain new and useful Improvements in Automatic Oilers, of which the following is a specification.

This invention is an improved lubricating device adapted to automatically deliver oil or other liquid lubricant in very small but sufficient quantities to the parts to be lubricated when the parts are in motion, but automatically prevent further delivery of the lubricant when the parts come to rest.

My improved device is intended for use on those parts of the machine, apparatus, or other mechanisms which, when in operation, have a bodily back-and-forth movement of some kind which is transmitted to and participated in by the whole, or at least a part, of the lubricating device. This back-and-forth movement of the mechanism may be, and in fact usually is, through a comparatively short range and may be a vibrating, jarring, shaking, swinging, swaying or other movement. Merely as an example of such mechanisms I have in mind particularly the shackles, ball joints, bearings and other parts of an automobile.

As an important feature of my invention, I utilize the resulting bodily movement of a part of the device to carry successive, small quantities of lubricant from a source of supply to the oil delivering means. As this movement of the carrier stops with the stopping of the mechanism, the delivery of oil is also simultaneously stopped when the parts come to rest. This automatic control of the delivery of the oil is thus effected without the employment of valves or the use of any parts requiring careful or accurate workmanship or expensive materials, and the device may be made at very low cost.

Preferably the casing of the device is in the form of an oil cup or small oil reservoir with the inner end of the oil delivery means and the oil carrier both disposed therein above the normal liquid level. The carrier, the movement of which is effected solely by the vibration or other back-and-forth movement of the mechanism to be oiled and of the oil cup carried thereby, comes into oil receiving relationship to the source of supply (for instance, a wick leading up from the oil in the cup) and oil delivering relationship to the outlet.

In the preferred embodiment, the carrier is in the form of a ball moved back and forth substantially in a horizontal direction by the vibration or other movement of the mechanism and intermittently comes in contact with an oil saturated feeding wick. Any oil which the ball may receive from the wick may drain by gravity or be delivered in any other suitable manner to the outlet.

Of the accompanying drawings.

Similar reference characters indicate similar parts or features in all of the views.

Figure 1:
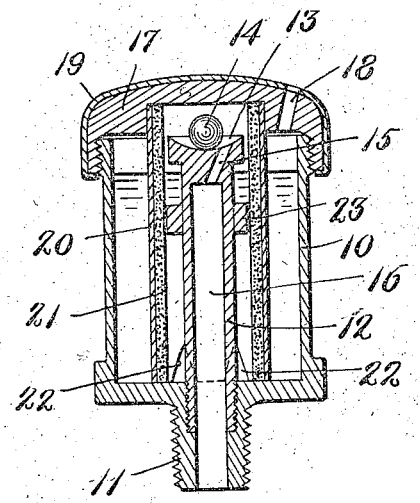
Figure 1 represents a vertical section through my improved automatic oiler in one of its embodiments.
Figure 2:
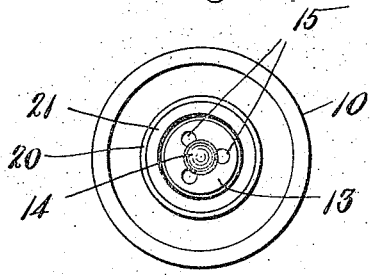
Fig. 2 is a plan view with the cover or cap removed.

Referring first to Figs. 1 and 2, the oil cup or reservoir 10 is provided with suitable means for connecting it to the part or place to be lubricated, such means being illustrated as an apertured nipple 11. Rising from the inner end of said nipple is a tube or hollow post 12 having its upper end formed with a concave seat 13 disposed above the normal liquid level in the reservoir. The oil carrier or vibrator is in the form of a ball 14 which may move back and forth over this seat. Several small ducts 15 connect the surface of said seat with the relatively larger duct 16 which latter extends down through the tube or post 12 and the attaching nipple 11 to permit oil to pass to the part to be lubricated.

The small ducts 15 are shown as converging downwardly, their upper ends being sufficiently spaced apart to permit the vibrator 14, when the device is at rest, to bear or rest upon a portion of the seat that has no duct communication with the interior of the post 12.

A suitable cap or cover 17 is provided, and may have a filling hole 18 which can be closed by a thin imperforate shell 19 rotatably connected with the cap, to prevent access of dust to the reservoir or the escape of oil therefrom.

A capillary device is provided to elevate a small quantity of oil from the reservoir to a point where the oil carrying vibrator may take and transmit it to the ducts 15 or to one of said ducts when said vibrator is shifted away from its central position of rest by jarring of a machine in motion. Said capillary device, in the embodiment of my invention illustrated, consists of a tube of absorbent or wicking material 21, said tube being circular or otherwise shaped in cross section, and having its lower end within the body of the oil and its upper end in the path of movement of the oil carrying vibrator. Merely as an example of a convenient way of supporting said tubular capillary device and holding it in proper relationship to said vibrator, I have shown it as a lining for a tube 20, the lower ends of the latter and of the wicking being provided with cut away portions 22, and resting on the bottom of the reservoir. The capillary device may be suitably steadied as by having its upper end extend into a socket in the under side of the cap 17. It may fit said socket with sufficient friction to enable it to be lifted out with the cap when the latter is removed, if desired.

To prevent oil from being splashed from the reservoir up and onto the upper end of the post 12, thereby feeding oil too rapidly, said post is preferably provided with an enlargement which may consist of a collar or washer 23 secured at a suitable height to said tube or post.

In operation, jarring or vibration of the machine to which the oiler is attached, causes the vibrator to oscillate on its seat, contacting at times with the inner wall of the capillary device and so receiving a small quantity of oil which, as the vibrator returns over one or more of the small ducts 15, will be gradually supplied to the part to be lubricated, said small quantity escaping through such duct or ducts and through the larger duct 16.

Figure 3:
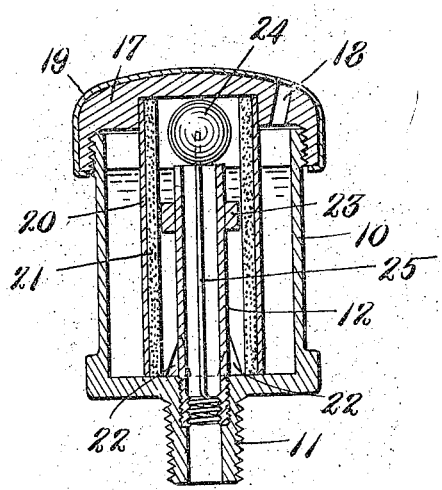
Figs. 3 and 4 are views similar to Figs. 1 and 2 respectively, but illustrating another embodiment of my invention.
Figure 4:
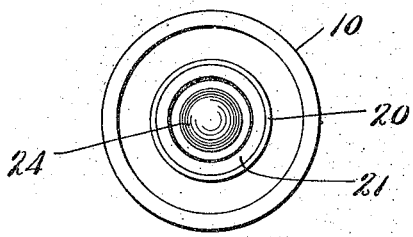

In the embodiment of the invention illustrated in Figs. 3 and 4 the construction is practically the same as that already described except in the following respects, viz: the upper end of the tube or hollow post is entirely open, and the vibrator 24 is carried by the upper end of a spring 25 which is suitably mounted to hold the vibrator in a central position when the machine is at rest. Such mounting of the spring may be by coiling its lower portion and fitting it to an internally threaded portion of the tube 12. The vibrator is of such size and weight that when the machine is in motion it will frequently contact with the inner wall of the capillary device and take small quantities of oil therefrom, which oil will then work down the spring and pass through the aperture in nipple 17 to the place to be lubricated. While I have illustrated the vibrator 24 as in the form of a ball or sphere, it is to be understood that I do not limit myself thereto, as it may be more in the shape of a disk or cup, or other form.

Having now described my invention, what I claim is:—

1. An automatic oiler adapted for use on mechanisms having a back-and-forth movement, said oiler having a reservoir provided with an outflow duct leading from an upper portion thereof whereby oil can not escape through said duct under normal stationary conditions, a capillary device to elevate small quantities of oil above the level of that in the reservoir, and a vibrator having motion imparted thereto solely by the said back-and-forth movement of said mechanism and mounted to move between a position of contact with said capillary device and a position to deliver oil to said duct.

2. An automatic oiler having a reservoir provided with an outflow duct leading from an upper portion thereof whereby oil can not escape through said duct under normal stationary conditions, a capillary device surrounding said duct and extending above it, and a vibrator free to move back-and-forth above the end of said tube by a jarring or slight movement of the reservoir and intermittently contact with said capillary device, the oil adhering to said vibrator after each contact being free to flow from said vibrator down said tube by gravity.

3. An automatic oiler having a reservoir provided with an outflow duct leading from an upper portion thereof whereby oil can not escape through said duct under normal stationary conditions, a tube having a lining of absorbent material surrounding said duct and extending above it, and a vibrator mounted to move between a position of contact with said lining and a position to deliver oil to said duct.

4. An automatic oiler having a reservoir provided with a tube rising from its bottom and a movable cap or cover closing the upper end of said reservoir, a capillary device surrounding said tube and engaged with said cap or cover to be steadied thereby, and a vibrator also encircled by said capillary device and mounted to move back and forth substantially in a horizontal direction above the end of said tube and intermittently contact with said capillary device.

5. An automatic oiler having a reservoir provided with an outflow duct leading from an upper portion thereof whereby oil cannot escape through said duct under normal stationary conditions, a capillary device to elevate small quantities of oil above the level of that in the reservoir, and a vibrator held out of contact with said capillary device by gravity when stationary and intermittently contacting with said capillary device to receive oil from the latter when said reservoir is jarred or slightly shaken.

6. An oiler adapted to be rigidly secured to a mechanism to be oiled and thereby subjected to the jarring, vibration or other similar movement of such mechanism, said oiler including oil supply means, an oil delivery means and an oil carrying vibrator operating to transfer oil from said first mentioned means to said second mentioned means, the movement of said vibrator being imparted thereto solely by the bodily movement of said mechanism.

7. An oiler adapted to be carried by a mechanism having a back-and-forth movement and including an oil cup, an oil delivery means having its oil receiving portion above the normal liquid level within said cup, and a vibrator bodily movable by said movement of said mechanism and intermittently receiving oil and carrying it to said delivery means.

8. An oiler adapted to be carried by a mechanism having a back-and-forth movement and including an oil cup, an oil delivery tube having an open end above the normal liquid level within said cup and a vibrator receiving its movement solely from the back-and-forth movement of said mechanism and operating to intermittently receive oil and carry it to a point from which it may drain by gravity through said delivery tube.

9. An oiler adapted to be carried by a mechanism having a back-and-forth movement and including an oil cup, an upright delivery tube within said oil cup and having its upper oil receiving end disposed above the normal liquid level within said oil cup, a capillary device for raising oil from said cup to a point above the upper end of said tube, and a movable member for transmitting separate successive portions of oil from said capillary device to said tube, the movement of said member being imparted thereto by said back-and-forth movement of said mechanism.

10. An automatic oiler having an oil cup provided with an outflow duct leading from the upper portion thereof whereby oil cannot escape through said duct under normal stationary conditions, an annular tube of absorbent material surrounding said duct and spaced therefrom and extending above the upper end of the latter, and a ball supported at the upper end of said duct and movable into intermittent engagement with said tube to receive oil from the latter and permit said oil to drain from the ball down said duct.

11. An automatic oiler having a reservoir provided with an outflow duct having its oil receiving end within said reservoir above the normal liquid level in the latter, a capillary device extending upwardly from the oil within said reservoir to a point spaced from said duct, and a member movable back and forth solely by the jarring or shaking action of the mechanism to which said oiler is attached when said mechanism is in operation and serving to carry successive small quantities of oil from said capillary device to said duct.

12. An automatic oiler having an oil cup provided with an outflow duct leading from the upper portion thereof above the normal liquid level, a cover for said cup, a tube extending downwardly from said cover into the oil and surrounding but spaced from said duct and having a lining of absorbent material, and means for intermittently carrying small quantities of oil from said absorbent lining to the upper end of said duct.

13. An automatic oiler having an oil cup provided with an outflow duct leading from the upper portion thereof above the normal liquid level, a cover for said cup, a tube extending downwardly from said cover into the oil and surrounding but spaced from said duct and having a lining of absorbent material, and means for intermittently carrying small quantities of oil from said absorbent lining to the upper end of said duct, said member having a back-and-forth movement imparted thereto solely by the jarring or shaking movement of the mechanism to which said oiler is attached.

14. An automatic oiler having a source of oil supply, an oil delivery means and a ball engaging only with said oil delivery means when the oiler is at rest and free to roll into oil receiving contact with said source upon comparatively slight lateral bodily movements of said oiler.

15. An automatic oiler having a source of oil supply, an oil delivery means and a member engaging only with said oil delivery means when the oiler is at rest and free to move into oil receiving contact with said source upon comparatively slight, lateral, bodily movements of said oiler.

16. An automatic oiler having a source of oil supply, an oil delivery means, and a member engaging only with one of them when the oiler is at rest and free to move back and forth into successive engagements with the other upon comparatively slight, lateral, bodily movements of said oiler.

In testimony whereof I have affixed my signature.

WILLIAM A. FREDERICK.